中  US009454357B2

(12) United States Patent
McDonald et al.

(10) Patent No.: US 9,454,357 B2
(45) Date of Patent: *Sep. 27, 2016

(54) UTILIZING A MULTI-SYSTEM SET CONFIGURATION TO UPDATE A UTILITY NODE SYSTEM SET

(71) Applicant: Itron, Inc., Liberty Lake, WA (US)

(72) Inventors: Brett McDonald, West Union, SC (US); Samuel Lee Whitfield, Wake Forest, NC (US); Gregory Shane Barrett, Hayesville, NC (US); Kevin David Guthrie, Seneca, SC (US); Scott Michael Collins, Apex, NC (US)

(73) Assignee: Itron, Inc., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/566,333

(22) Filed: Dec. 10, 2014

(65) Prior Publication Data

US 2015/0095900 A1    Apr. 2, 2015

Related U.S. Application Data

(63) Continuation of application No. 13/717,418, filed on Dec. 17, 2012, now Pat. No. 8,938,730.

(51) Int. Cl.
*G06F 9/44*        (2006.01)
*G06F 9/445*       (2006.01)
*G06F 11/14*       (2006.01)

(52) U.S. Cl.
CPC ............. *G06F 8/65* (2013.01); *G06F 11/1433* (2013.01)

(58) Field of Classification Search
CPC ......... G06F 8/65; G06F 11/1433; G06F 8/71

USPC ................................... 717/168–178; 709/203
See application file for complete search history.

(56) References Cited

U.S. PATENT DOCUMENTS 6,305,015 B1 * 10/2001 Akriche ................. G06F 8/71
                                                  717/168
6,493,871 B1    12/2002 McGuire et al.
(Continued)

FOREIGN PATENT DOCUMENTS

EP        2048561        4/2009
JP      2002333990      11/2002
(Continued)

OTHER PUBLICATIONS

Cadar et al, "Multi-version Software Updates", IEEE, pp. 36-40, 2012.*

(Continued)

*Primary Examiner* — Anil Khatri
(74) *Attorney, Agent, or Firm* — Lee & Hayes, PLLC (57) ABSTRACT

A system set of a utility node device, such as a kernel and/or root file system, may be updated by utilizing a multi-system set configuration. For example, the multi-system set configuration may include a first system set that is generally configured to act as an "active" set, a second system set (e.g., "idle" set) that is configured to operate when the first system set is non-operational or in an "idle" state, and a third system set that is configured to operate when the first and second system sets are non-operational. During an update of a system set, an update package may be applied to the second "idle" system set, while the first "active" system set remains operational. The utility node device may comprise a smart utility meter, sensor, control device, transformer, switch, relay, or the like.

20 Claims, 8 Drawing Sheets

(56) References Cited

U.S. PATENT DOCUMENTS

| | | | |
|---|---|---|---|
| 6,587,684 B1 | 7/2003 | Hsu et al. | |
| 6,876,644 B1 | 4/2005 | Hsu et al. | |
| 6,938,075 B1 | 8/2005 | Abbott et al. | |
| 7,000,230 B1* | 2/2006 | Murray | G06F 8/61 717/170 |
| 7,313,791 B1* | 12/2007 | Chen | G06F 8/68 717/170 |
| 7,461,374 B1* | 12/2008 | Balint | G06F 8/68 717/135 |
| 7,526,539 B1 | 4/2009 | Hsu | |
| 7,721,110 B2* | 5/2010 | Kouznetsov | G06F 17/30206 709/201 |
| 7,743,372 B2 | 6/2010 | Armstrong et al. | |
| 7,761,865 B2* | 7/2010 | Stienhans | G06F 8/65 715/229 |
| 7,779,402 B2* | 8/2010 | Abernethy | G06F 8/67 709/203 |
| 7,797,695 B2* | 9/2010 | Motta | G06F 8/65 717/168 |
| 7,802,246 B1 | 9/2010 | Kennedy et al. | |
| 7,805,719 B2* | 9/2010 | O'Neill | G06F 8/65 717/168 |
| 7,837,959 B2 | 11/2010 | Cheng et al. | |
| 7,870,550 B1 | 1/2011 | Qureshi et al. | |
| 7,873,959 B2 | 1/2011 | Zhu et al. | |
| 7,921,419 B2* | 4/2011 | Chatterjee | 707/695 |
| 7,958,502 B2* | 6/2011 | Motta | G06F 8/68 717/168 |
| 8,205,194 B2 | 6/2012 | Fries et al. | |
| 8,209,680 B1* | 6/2012 | Le | G06F 17/30067 713/1 |
| 8,233,893 B2* | 7/2012 | Chen | G06F 8/68 455/403 |
| 8,245,219 B2 | 8/2012 | Agarwal et al. | |
| 8,316,364 B2* | 11/2012 | Stein | G06F 8/65 717/172 |
| 8,341,210 B1 | 12/2012 | Lattyak et al. | |
| 8,381,021 B2 | 2/2013 | Howard et al. | |
| 8,407,687 B2 | 3/2013 | Moshir et al. | |
| 8,539,479 B2* | 9/2013 | Kemmler | G06F 9/485 717/120 |
| 8,627,310 B2 | 1/2014 | Ashok et al. | |
| 8,656,386 B1 | 2/2014 | Baimetov et al. | |
| 8,667,479 B2 | 3/2014 | Johnsson et al. | |
| 8,677,343 B2 | 3/2014 | Averbuch et al. | |
| 8,701,102 B2* | 4/2014 | Appiah | G06F 8/65 717/171 |
| 8,745,614 B2 | 6/2014 | Banerjee et al. | |
| 8,769,127 B2* | 7/2014 | Selimis | H04L 67/06 709/223 |
| 8,924,950 B2* | 12/2014 | McDonald | G06F 8/65 709/203 |
| 2004/0168165 A1 | 8/2004 | Kokkinen | |
| 2004/0261072 A1 | 12/2004 | Herle | |
| 2014/0173579 A1 | 6/2014 | McDonald et al. | |
| 2014/0173580 A1 | 6/2014 | McDonald et al. | |

FOREIGN PATENT DOCUMENTS

| | | |
|---|---|---|
| JP | 2004094832 | 3/2004 |
| JP | 2006031455 | 7/2004 |
| JP | 2006298260 | 4/2005 |
| JP | 2006350850 | 6/2005 |
| JP | 2006502615 | 1/2006 |
| JP | 2006293512 | 10/2006 |
| JP | 2010518693 | 5/2010 |
| WO | WO2009074444 | 6/2009 |

OTHER PUBLICATIONS

Pukall et al, "JavAdaptor: Unrestricted Dynamic Software Updates for Java ", ACM, pp. 989-991, 2011.*

Cadar et al, Multi-version Software Updates:, IEEE, pp. 36-40, 2012.*

Thao et al, "Using Versioned Tree Data Structure, Change Detection and Node Identity for Three-Way XML Merging", ACM, pp. 77-86, 2010.*

Halpin et al, "Dynamic Provenance for SPARQL Updates using Named Graphs ", ACM, pp. 287-288, 2014.*

Wong et al, "Managing and Querying Multi-Version XML Data with Upda te Logging", ACM, pp. 74-81, 2002.*

Yasmin et al, "Security Issues Related with DNS Dynamic Updates for Mobile Nodes: A Survey ", ACM, pp. 1-6, 2010.*

Nilsson et al, "Key Management and Secure Software Updates in Wireless Process Control Environments", ACM, pp. 100-108, 2008.*

Hosek, et al., "Safe Software Updates via Multi-version Execution", IEEE, 2013, pp. 612-621.

Office action for U.S. Appl. No. 13/717,395, mailed on Apr. 15, 2014, McDonald et al., "Utility Node Software/Firmware Update Through a Multi-Type Package", 17 pages.

Office action for U.S. Appl. No. 13/717,418, mailed on Apr. 15, 2014, McDonald et al., "Utilizing a Multi-System Set Configuration to Update a Utility Node System Set", 16 pages.

PCT Search Report and Written Opinion mailed Jan. 28, 2014 for PCT Application # PCT/US13/69298.

PCT Search Report and Written Opinion mailed Apr. 16, 2014 for PCT Application No. PCT/US13/69289, 15 Pages.

Pukall, et al., "JavAdaptor: Unrestricted Dynamic Software Updates for Java", ICSE ' 11, ACM, 2011, pp. 989-991.

Wahler, et al., "Dynamic Software Updates for Real-Time Systems", ACM, 2009, pp. 1-6.

Wernli, et al., "Using First-class Contexts to realize Dynamic Software Updates", IWST '11, ACM, 2011, pp. 1-11.

Australian Examination Report No. 1 mailed Apr. 21, 2016 for Australian patent application No. 2013364075, a counterpart foreign application of U.S. Pat. No. 8,924,950, 2 pages.

The Japanese Office Action mailed Aug. 9, 2016 for Japanese patent application No. 2015-547946, a counterpart foreign application of U.S. Pat. No. 8,924,950 (Japanese Pat. Appl. No. 2015-547946 is a counterpart foreign application due to having a substantively identical disclosure to U.S. Appl. No. 14/566,333).

* cited by examiner

UTILIZING A MULTI-SYSTEM SET CONFIGURATION TO UPDATE A UTILITY NODE SYSTEM SET

RELATED APPLICATIONS

This application claims priority to and is a continuation of U.S. patent application Ser. No. 13/717,418, filed on Dec. 17, 2012, the entire contents of which are incorporated herein by reference.

BACKGROUND

Updating software and/or firmware on utility node devices, such as smart utility meters, control devices, sensors, etc., is currently complex and time consuming. For example, due to different versions of the software or firmware that are installed on the devices and/or different types of devices, the devices may require different update files to upgrade to a newer version of the software or firmware. In addition, because the update files are relatively large, and are transmitted wirelessly to the utility node devices, the upgrade process requires a substantial amount of time to both transmit the update files to the devices and perform the update at the devices. Accordingly, there is an increasing need to update software and firmware of utility node devices in an efficient manner.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

As discussed above, current techniques for updating software and/or firmware on a utility node device, such as smart utility meter, control device, sensor, etc., are complex and time consuming.

This disclosure describes, in part, techniques for updating software/firmware on a utility node device by utilizing an update package that includes update items related to different types of the software/firmware. In particular implementations, the utility node device may receive the update package and selectively install one or more of the multiple update items based on a type of the software/firmware that is currently installed on the device. The different types of software/firmware may relate to different versions of the software/firmware (e.g., versions 1 and 2) and/or different types of hardware (e.g., main memory of the utility node, communication hardware, etc.). For example, a utility node device including version 2 of a driver may be upgraded to version 3 of the driver by installing a portion of an update package that relates to version 3 of the driver, while ignoring another portion of the update package that relates to version 1 of the driver. In another example, a utility node may update an operating system stored in main memory by installing a portion of an update package that relates to the operating system, while ignoring another portion of the update package that relates to a modem module that is stored external to the main memory. In some instances, this may allow a single update package to be, for example, broadcast or otherwise provided to multiple different devices that may need different updates or portions of the updates, such as in the case when different devices are operating with different types of software/firmware.

In some embodiments, the multiple update items of the update package may comprise delta files that contain differences between different types of software/firmware. For instance, an update package for a driver that includes versions 1-3, may include a delta file containing differences between versions 1 and 2 and another delta file containing differences between versions 2 and 3. This may enable a utility node device to install the update relatively quickly, given that the update items are smaller than full versions of the software/firmware. Further, the relatively small delta files may allow the update package to be transmitted over a wireless connection in a time-efficient manner.

This disclosure also describes, in part, techniques for updating a system set of a utility node device by utilizing a multi-system set configuration. In particular implementations, the utility node device may include multiple system sets with one system set generally operating in an "active" state (e.g., operational state). The multiple system sets may include a first system set that is generally configured to act as an "active" system set, and one or more "idle" system sets that are in an idle state (e.g., non-operational) when the first system set is in the active or operational state. In one example, the one or more idle system sets may include a second system set that is idle when the first system set is active, but is configured to be made active when the first system set is non-operational or in an idle state. The multiple system sets may also include a third system set (e.g., "fail-safe" system set) that is generally idle, but is configured to be made active when the first and second system sets are non-operational. In some instances, the third system set may comprise a factory installed set that remains unmodified (e.g., unalterable). In other embodiments, additional system sets may be used. A system set may comprise an operating system that includes a kernel and a root file system.

During an update of a system set on the utility node device, the idle system set may be updated with a newer version of the system set, while the active system set may remain operational (e.g., carry-out normal utility node functions). The idle system set may be updated on a version-by-version basis until a specified version is reached (e.g., a newest version of the system set). In some instances, the idle system set is updated from delta files that contain differences between different versions of the system set. By updating the idle system set and leaving the active system set in its current condition, the utility node device may maintain operation of the device (e.g., continue to collect metering data, continue to relay network traffic, etc.) during the update process.

After the idle system set has been updated, the utility node device may enable the idle system set and perform one or more system checks to determine whether the newly activated system set (previous idle system set) is operating properly. In the event that the newly activated system set is not operating properly, the utility node device may revert to the previously activated system set. Thereafter, if the active system set does not operate properly, the utility node device may enable the fail-safe system set. By utilizing multiple system sets, the utility node device may maintain operation of the device, even in the event that one or more of the system sets become non-operational.

As used herein, a "system set" may generally comprise software, firmware, and/or data to operate the utility node. A system set may comprise an operating system that includes (i) a kernel that manages hardware resources of the utility node and/or (ii) a root file system that includes data to operate the utility node, such as files that fulfill utility node functionality and data storage (e.g., applications, libraries, scripts, database data, etc.).

The update techniques are described herein in the context of utility node devices implemented as any of a variety of computing devices, such as smart utility meters, sensors, control devices, transformers, switches, relays, or the like. In general, the utility node devices are configured in a communication network, such as a "mesh" network in which nodes relay information from node-to-node, a "star" network in which nodes send information to a designated node, a "mobile" or "handheld" network in which nodes broadcast or "bubble up" their information to be collected by a mobile or handheld reader device that follows a route to read the meters, and/or other networks. Although the update techniques are discussed herein in the context of utility node devices configured in a utility network, these techniques may alternatively, or additionally, be applicable to other types of computing devices and/or networks.

This brief introduction is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

Example Architecture

Figure 1:
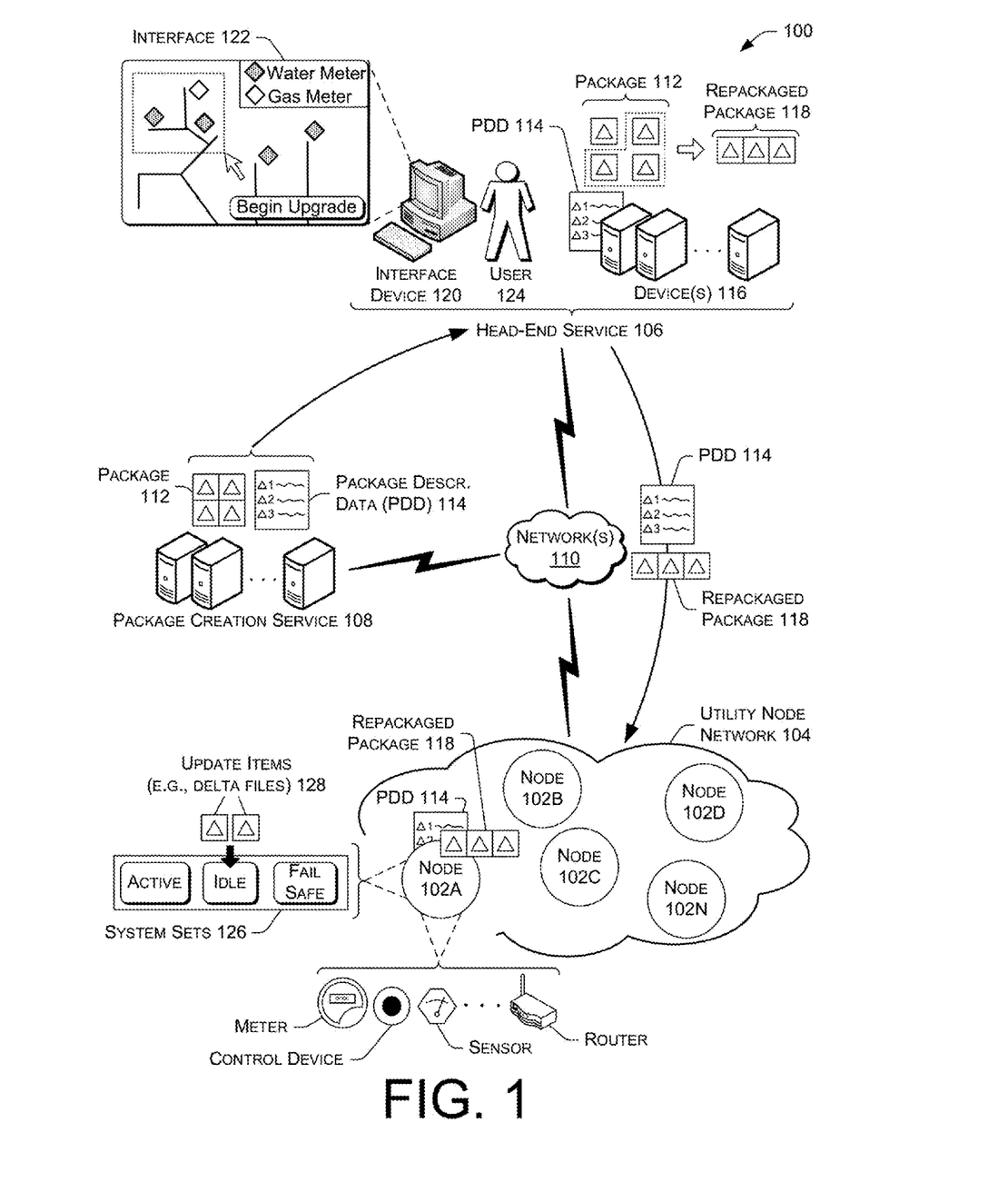
FIG. 1 illustrates an example architecture usable to update software and/or firmware of a utility node device.

FIG. 1 illustrates an example architecture 100 in which the software/firmware update techniques described herein may be implemented. The architecture 100 includes a plurality of nodes 102A, 102B, 102C, 102D, . . . 102N (collectively referred to as nodes 102) each configured to update software/firmware (e.g., operating system, system set, etc.) of the respective node. In one example, the software/firmware of the nodes 102 may be updated by receiving an update package and applying individual update items of the package that relate to different types of the software/firmware. When, for example, the update package includes an update item for a system set, the nodes 102 may apply the update item to an idle system set, as discussed in further detail below.

In general, an update package may include update items for updating any type of software/firmware of the nodes 102. For example, the package may include items for updating low-level boot-up binary data (e.g., u-boot), mid-level kernel data, high-level operating system data (which may include the kernel data and root file system data), binary data for external device(s) (e.g., monolithic data), a module, an application, a device driver, and so on.

As illustrated in FIG. 1, the nodes 102 may form a utility node network 104, such as an autonomous routing area (ARA) network which may be part of a larger utility communication network. The utility node network 104 may comprise, for example, a wide area network (WAN), metropolitan area network (MAN), local area network (LAN), neighborhood area network (NAN), personal area network (PAN), or the like. The nodes 102 may be communicatively coupled to each other via direct communication paths (e.g., wireless connections). Each direct communication path may represent a plurality of channels over which a node is able to transmit and/or receive data. Each of the plurality of channels may be defined by a frequency range which may be the same as or different from frequency ranges of others of the plurality of channels. In some instances, the plurality of channels comprises radio frequency (RF) channels.

Each of the nodes 102 may be implemented as any of a variety of computing devices such as, for example, smart utility meters (e.g., electric, gas, and/or water meters), control devices, sensors (e.g., temperature sensors, weather stations, frequency sensors, etc.), transformers, routers, servers, relays (e.g., cellular relays), switches, valves, combinations of the foregoing, or any device couplable to a communication network and capable of sending and/or receiving data. In some cases, the nodes 102 may include different types of nodes (e.g., smart meters, cellular relays, sensors, etc.), different generations or models of nodes, and/or nodes that otherwise are capable of transmitting on different channels and using different modulation techniques, data rates, protocols, signal strengths, and/or power levels. In these cases, the architecture 100 may represent a heterogeneous network of nodes.

In the example of FIG. 1, the nodes 102 are configured to communicate with a head-end service 106 and/or a package creation service 108 through a backhaul network(s) 108, such as the Internet. The nodes 102 may communicate with the head-end service 106 via an edge device (e.g., cellular relay, cellular router, edge router, DODAG root, etc.) which serves as a connection point of the utility node network 104 to the backhaul network(s) 110. In some instances, the utility node network 104 may be configured as a "fixed" or "star network" in which the nodes 102 communicate directly with a data collector, or as a "mesh network" in which the nodes 102 communicate with an edge device directly or via one or more intervening upstream devices. The architecture of FIG. 1 may generically be representative of either a star network or a mesh network.

The package creation service 108 may create an update package 112 to be used at the nodes 102 for upgrading software/firmware. In some examples, the service 108 is associated with the head-end service 106, while in other examples the service 108 may comprise a third party. The package 112 may include one or more update items to upgrade software/firmware that is already installed on the nodes 102 and/or to add new software/firmware to the nodes 102. In some instances, the update items are configured to update one or more versions of utility node software/firmware. By way of example, the package 112 may include an update item (e.g., file image) to upgrade an operating system of a utility node from version 2 to version 3 and another update item to upgrade the operating system from version 3 to version 4.

In some instances, an update item of the update package 112 may comprise a delta file that contains differences between different versions of the software/firmware, such as sequential versions of the software/firmware. Here, the particular version of the software/firmware may be represented by the update item. A delta file may be relatively small in size in comparison to a full version of software/firmware. To illustrate, if version 3 of an operating system includes a new module, but is otherwise the same as version 2 of the operating system, the update package 112 may include a delta file that includes only the new module. By including different versions of software/firmware in the package 112 and/or representing the different versions with delta files in the package 112, the nodes 102 may be updated with relatively small amounts of data, in comparison to previous update processes which utilized multiple monolithic update packages. Further, in some instances, because the nodes 102 may be configured with logic to determine what update items to apply/install, a same update package may be broadcast or otherwise provided to multiple nodes that are configured differently.

The package creation service 108 may also generate package description data (PDD) 114 describing contents of the update package 112. The PDD 114 may sometimes be referred to as a "release manifest," indicating that the data 114 is associated with a new release of software/firmware (e.g., a new version of the software/firmware). The PDD 114 may be utilized to assist the head-end service 106 and/or nodes 102 to identify the contents of the update package 112, determine what update items to install/apply, and so on. By way of example, the PDD 114 may include:

Information identifying a software, firmware, and/or hardware resource to which an update item is to be applied. This information may include a name or other identifying information of a file to be replaced.

Information identifying a type of device to which an update item may be applied. If, for example, the package 112 includes an update item to install a driver on a poly phase node and another update item to install the same driver on a single phase node, the PDD 114 may indicate which update item is applicable to which type of node. A type of a device may generally be based on hardware, software, and/or firmware functionality of a device. For example, a type of device may be determined by whether the device is a smart meter, cellular relay, router, sensor, poly phase or single phase device, and so on. In one example, a type of a device is based on a recognized "class" of the device within software/firmware.

Information identifying a type of an update item. For example, the PDD 114 may indicate that a particular update item may be utilized to update a driver from version 2 to version 3. In another example, the PDD 114 may indicate that an update item is relevant to updating software/firmware related to a particular hardware target type (e.g., main memory, modem, etc.).

Information identifying a prerequisite update item that should be applied before another update item is applied. For example, the PDD 114 may indicate that a particular driver needs to be installed before another related driver is installed. If the particular driver is not already installed, a node may be required to install the particular driver before proceeding to install the related driver. In another example, the PDD 114 may indicate a particular version of an operating system that a node needs to be at before installing a driver.

Validation criteria to be satisfied in order to apply one or more update items. For example, the validation criteria may include checking a version of hardware/firmware/software associated with a utility node, checking whether hardware/firmware/software to be updated exists on a utility node, verifying image system resources (e.g., disk space, battery state, etc.), verifying an existing functionality configuration on a utility node (e.g., verifying that particular functionality is enabled), verifying consumption data values, and so on. The validation criteria may include validation data, such as a hash value.

A unique update item identifier identifying an update item.

Information identifying a hardware range to which an update item is to be applied. For example, the information may indicate that one update item is applicable to memory that has been expanded, and another update item is applicable to the memory in its unexpanded state. This may allow a single update package that includes the two update items to be used for utility nodes that have the expanded memory and utility nodes that do not have the expanded memory.

Information identifying an installation path. The installation path may indicate which update items need to be installed and/or in what order.

As illustrated in FIG. 1, the update package 112 and/or PDD 114 may be sent to the head-end service 106 to be distributed to the nodes 102 of the utility node network 104. In some instances, the update package 112 and PDD 114 are maintained together so that the package 112 may be utilized efficiently.

The head-end service 106 may perform processing to prepare the update package 112 for distribution and/or cause an update package to be distributed to the nodes 102. In some instances, the head-end service 106 may represent and/or be associated with a central office of a utility. Additionally, or alternatively, the service 106 may include a centralized meter data management system which performs processing, analysis, storage, and/or management of data received from the nodes 102.

The head-end service 106 may include one or more computing devices 116, such as servers, personal computers, laptop computers, etc., configured to repackage the package 112 to form a repackaged package 118. The repackaged package 118 may be created by selecting update items of the package 112 that are applicable to updating a particular group of the nodes 102. For instance, if the nodes 102A-102C are identified to be updated to version 3 of an operating system, and the nodes 102A-102C already include versions 1 and 2, then the service 106 may select an update item to update the operating system from version 2 to version 3 and leave out an update item to update the operating system from version 1 to version 2.

As illustrated in FIG. 1, the head-end service 106 may also include an interface device 120 that provides an interface 122 for deploying the update package 112 and/or repackaged package 118. Although the interface 122 is illustrated as being provided by the interface device 120, in some instances all or part of the interface 122 functionality may be provided by the device(s) 116. The interface 122 may enable a user 124 to select one or more of the nodes 102 to be updated, a type (e.g., electricity meter, water meter, gas meter, gateway device, etc.) of one or more of the nodes 102 to updated, software/firmware to be updated on one or more of the nodes 102, and/or other information relevant to updating the nodes 102. Further details of the example interface 122 will be discussed below in reference to FIG. 7.

After the head-end service 106 has identified nodes of the utility node network 104 to update, through either the interface 122 or separate processing, the service 106 may distribute the repackaged package 118 and/or the package 112 to the identified nodes. In one example, the service 106 sends the repackaged package 118 and/or the package 112 to an edge device of the network 110 for distribution to one or more of the nodes 102. Although the repackaged package 118 is illustrated as being distributed in the example of FIG. 1, in other examples the package 112 may be distributed without being repackaged.

Although the example of FIG. 1 illustrates the head-end service 106 in a single location, in some examples the service 106 may be distributed amongst multiple locations and/or may be eliminated entirely (e.g., in the case of a highly decentralized distributed computing platform).

The node 102A may be representative of one or more of the nodes 102 of the utility node network 104. As discussed above, the node 102A may be configured to update its software/firmware (e.g., system set, etc.). In the example of FIG. 1, the node 102A receives the repackaged package 118 and the PDD 114 either directly from the head-end service 106 or indirectly from the head-end service 106 through one or more upstream nodes (e.g., nodes closer to the service 106). In some instances, the package 118 and/or PDD 114 are received through multiple transmissions on the utility node network 104 based on, for example, congestion of the network 104 and/or transmission capacities/requirements of the network 104. In any event, the repackaged package 118 and PDD 114 may be stored at the node 102A until an activation message is received or another event occurs.

When the repackaged package 118 is activated at the node 102A to update software/firmware, the node 102A may determine one or more update items of the package 118 to apply to the node 102A. For example, the node 102A may identify a current version of software/firmware that is installed on the node 102A and update items that are applicable to updating the current version to a newer version of the software/firmware. The node 102A may then apply/install the one or more determined update items on a version-by-version basis until a particular version of the software/firmware is reached. As noted above, in some instances the update items may comprise delta files that contain differences between versions of software/firmware.

In some embodiments, the package 118 may include one or more update items that relate to updating system sets 126 of the node 102A. Here, the node 102A may apply/install the one or more update items to an idle system set while an active system set remains operational (e.g., carries-out normal operations). As illustrated in FIG. 1, update items 128, such as delta files of the system set, may be applied to the idle system set, leaving the active system set and fail-safe system set unaltered. Further details of these updating techniques will be discussed below.

Example Head-End Service

Figure 2:
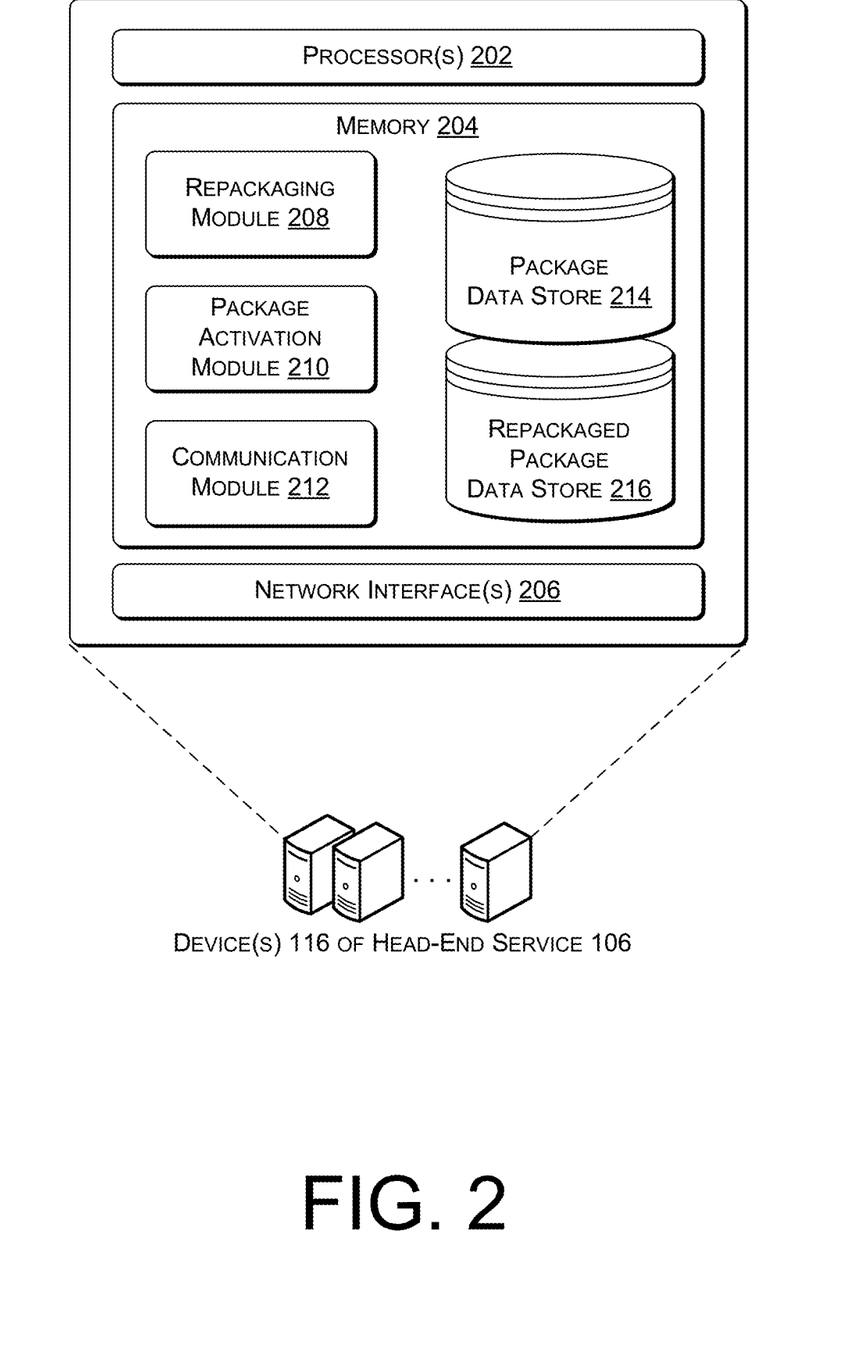
FIG. 2 is a schematic diagram showing additional details of an example device(s) of a head-end service of the architecture of FIG. 1.

FIG. 2 is a schematic diagram showing additional details of example device(s) 116 of the head-end service 106 in FIG. 1. The one or more devices 116 may be equipped with one or more processors 202, memory 204, and one or more network interfaces 206. The memory 204 may be communicatively coupled to the one or more processors 202 and may include software functionality configured as one or more modules.

As used herein, the term "module" is intended to represent example divisions of software for purposes of discussion, and is not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules may be implemented in whole or in part by hardware (e.g., as an ASIC, a specialized processing unit, etc.) to execute the described functions.

As illustrated in FIG. 2, the memory 204 includes a repacking module 208 configured to repackage an update package. For instance, the module 208 may utilize package description data to identify update items of an update package that are applicable to upgrading a particular group of nodes. The identified update items may then be included in a repackaged package. In some instances, the package description data may be modified based on the update items that are included in the repackaged package.

The memory 204 may also include a package activation module 210 configured to schedule updates at the nodes 102 and send activation messages to the nodes 102. The module 210 may enable the head-end service 106 to activate an update package at the nodes 102 at a particular time, such as a number of hours, days, or weeks after the update package is transmitted to the nodes 102. To activate an update package, the module 210 may cause an activation message to be sent to a particular node or group of nodes to instruct the particular node or group of nodes to update software/firmware by applying update items of an update package that has already been received.

Further, the memory 204 may include a communication module 212 to communicate with one or more of the nodes 102. In some instances, the module 212 may send and/or receive messages from an edge device of the utility node network 104 via the backhaul network 110.

As illustrated in FIG. 2, the memory 204 may also include a package data store 214 to store one or more update packages (e.g., packages received from the package creation service 108). In some instances, an update package is stored as a single piece of content, while in other instances an update package is parsed/extracted into individual update items that are stored separately. In one example, individually stored update items may be repackaged (e.g., through use of the interface 122) to form an update package for distribution to the nodes 102. The memory 204 may also store a repackaged package data store 216 to store one or more repackaged packages.

Example Utility Node Device

Figure 3:
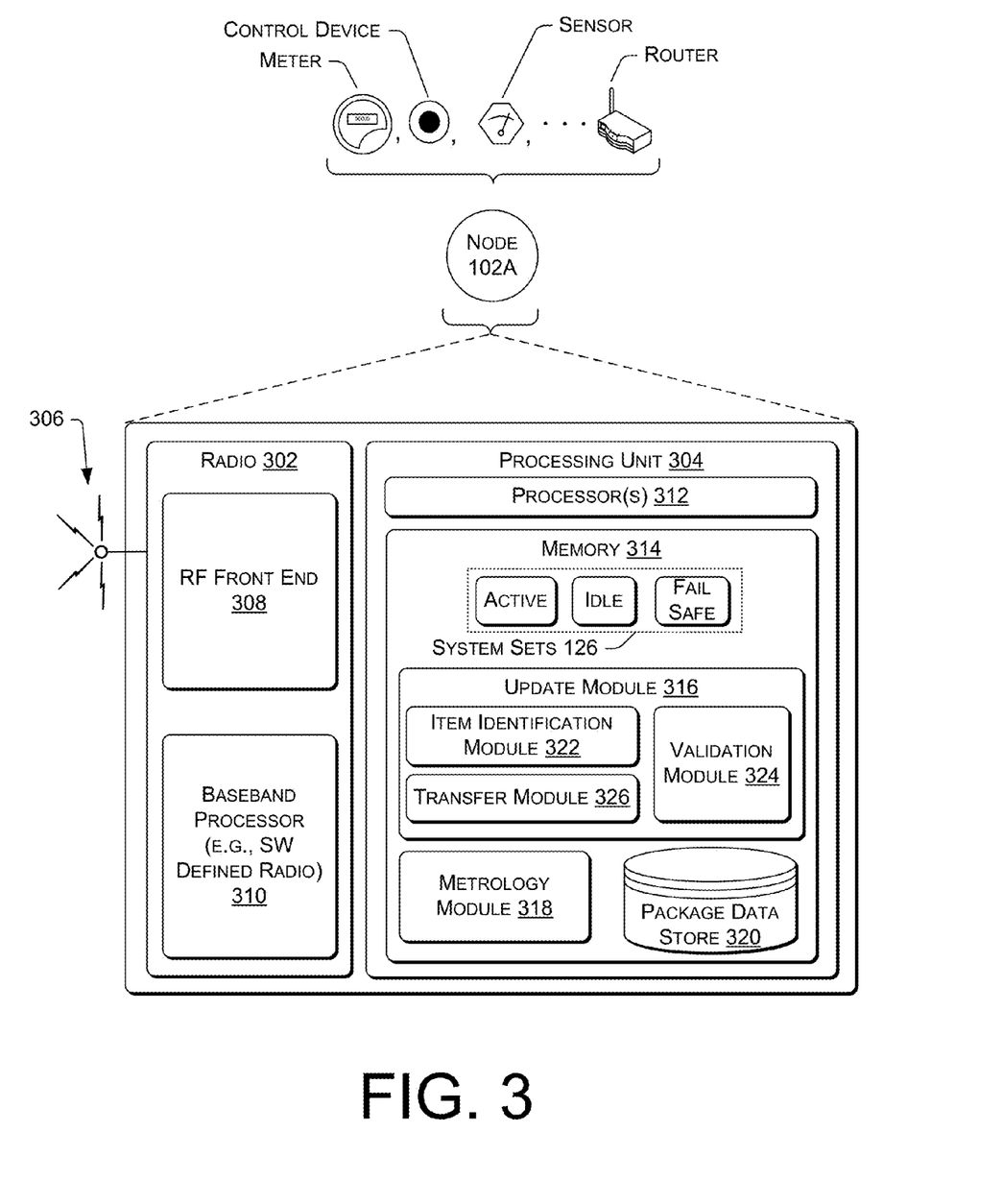
FIG. 3 is a schematic diagram showing additional details of an example utility node device of the architecture of FIG. 1.

FIG. 3 is a schematic diagram showing additional details of example node 102A in FIG. 1. As noted above, the node 102A is representative of each of the nodes 102 in the example 100. The node 102A may include a radio 302 and a processing unit 304. The radio 302 may comprise an RF transceiver configured to transmit and/or receive RF signals via one or more of a plurality of channels/frequencies. The radio 302 may also be configured to communicate using a plurality of different modulation techniques, data rates, protocols, signal strengths, and/or power levels. In the example of FIG. 3, the radio includes an antenna 306 coupled to an RF front end 308 and a baseband processor 310. The RF front end 308 may provide transmitting and/or receiving functions. The RF front end 308 may include high-frequency analog and/or hardware components that provide functionality, such as tuning and/or attenuating signals provided by the antenna and obtained from one or more of the nodes 102. The RF front end 308 may provide a signal to the baseband processor 310.

In one example, all or part of the baseband processor 310 may be configured as a software (SW) defined radio. In one implementation, the baseband processor 310 provides frequency and/or channel selection functionality to the radio 302. For example, the SW defined radio may include mixers, filters, amplifiers, modulators and/or demodulators, detectors, etc., implemented in software executed by a processor or application specific integrated circuit (ASIC) or other embedded computing device(s). The SW defined radio may utilize processor(s) 312 and software defined and/or stored in memory 314. Alternatively, the radio 302 may be implemented at least in part using analog components.

The processing unit 304 may include the one or more processors 312 communicatively coupled to the memory 314. The memory 314 may be configured to store the system sets 126 including an active system set, an idle system set, and a fail-safe system set, discussed in further detail below in reference to FIG. 8. The memory 314 may also store an update module 316, a metrology module 318, and a package data store 320. In some instances, the update module 316 and/or metrology module 318 are part of one or more of the system sets 126.

The update module 316 may be configured to update software/firmware of the node 102A. To implement this functionality, the update module 316 may include an item identification module 322, a validation module 324, and transfer module 326. The item identification module 322 may process an update package to identify (e.g., determine) one or more update items of an update package that are applicable to updating software/firmware on the node 102A. The one or more items may be identified based on package description data describing contents of the update package, a particular version of the software/firmware that is installed on the node 102A, a type of the node 102A, and/or other information. If, for example, the node 102A includes version 1 of a driver, and the driver is to be updated to version 3, the module 322 may identify update items of the update package that are related to versions 2 and 3. Alternatively, if the node 102A does not have version 1 of the driver installed yet, versions 1-3 may be identified to be applied during the update.

The validation module 324 may be configured to validate one or more conditions related to updating one or more update items. For example, the module 324 may perform one or more validation checks to check that a device type of the node 102A matches a device type of a particular update item, check that a prerequisite update item has been applied to the node 102A, check that the node 102A is not operating on a secondary power source (e.g., battery), or check any other function, data, or configuration of the node 102A.

Upon performing the one or more validation checks, the validation module 324 may determine a level of compliance with the one or more checks and proceed with an update based on the level of compliance. If, for example, the level of compliance is relatively low (e.g., less than half of the checks are satisfied), the module 324 may prevent the update from being performed. While, if the level of compliance is relatively high (e.g., more than half of the checks are satisfied), the module 324 may proceed with the update. In one example, the level of compliance includes one of three levels of severity comprising: level 1—less than a first threshold number of validation checks failed (continue applying an update item), level 2—more than the first number of validation checks failed but less than a second threshold number failed (move to next update item and do not apply the current update item), level 3—more than the second threshold number of validation checks failed (stop entire update process). In some instances, the PDD 114 may specify how the level of compliance is determined and/or the level of compliance needed to proceed with applying one or more update items. By performing one or more validation checks, the module 324 may avoid applying/installing update items that are not applicable, such as update items that are related to a version of software/firmware that has already been installed on the node 102A.

The transfer module 326 may be configured to perform different processes to a transfer an update item to the node 102A. The transfer process may be based on a type of the update item (e.g., a type of software/firmware to which an update item is applicable). In some instances, there may be different processes for applying/installing different types of update items on the node 102A. As such, the transfer module 326 may be configured to perform such processes. To illustrate, the module 326 may utilize a first set of techniques to install an update item related to a driver of the node 102A and utilize a second set of techniques to install an update item related to a system set of the node 102A.

In instances when an update item relates to a system set of the node 102A, the update module 316 may apply/install the update item to the idle system set (e.g., a system set that is in an "idle" or "non-operational" state). The idle system set may be updated while the active system set maintains regular operations (e.g., collects consumption data, communicates with other nodes, etc.). After the idle system set is updated, the module 316 may enable the idle system set to take-over operations of the node 102A and become the "active" system set. One or more system checks may then be performed to determine whether the previous idle system set (which is now active) is operating properly. In the event that the idle system set is not operating properly, the utility node device may revert to the previous active system set. Thereafter, if the active system set does not operate properly, the utility node may enable the fail-safe system set to take-over operations of the node 102A. By doing so, the node 102A may maintain operation, even in instances when one or more system sets fail.

The metrology module 318 may be configured to collect consumption data of one or more resources (e.g., electricity, water, natural gas, etc.). The consumption data may include, for example, electricity consumption data, water consumption data, and/or natural gas consumption data. The consumption data may include data generated at the node 102A, another node (e.g., the nodes 102B, 102C, etc.), or a combination thereof. The collected consumption data may be transmitted to a data collector in the case of a star network or, in the case of a mesh network, to one or more other nodes 102 for eventual propagation to the head-end service 106 or another destination. In some instances, consumption data is collected at the node 102A while software/firmware of the node 102A is being updated.

The memory 314 (as well as the memory 204 and all other memory described herein) may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

Example Processes

Figure 4:
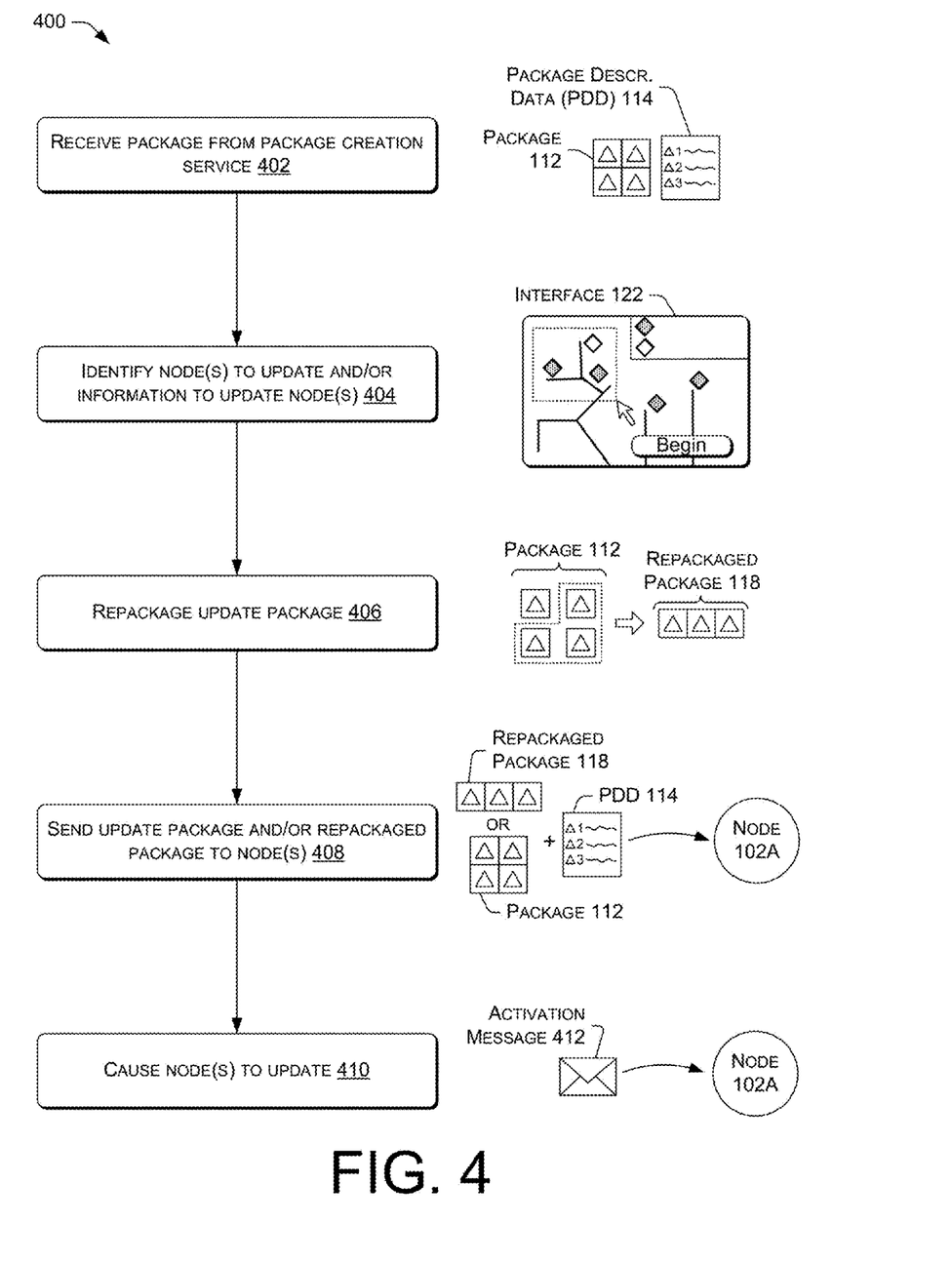
FIG. 4 illustrates an example process for repackaging an update package and causing the update package or the repackaged package to be sent to a utility node(s).
Figure 5:
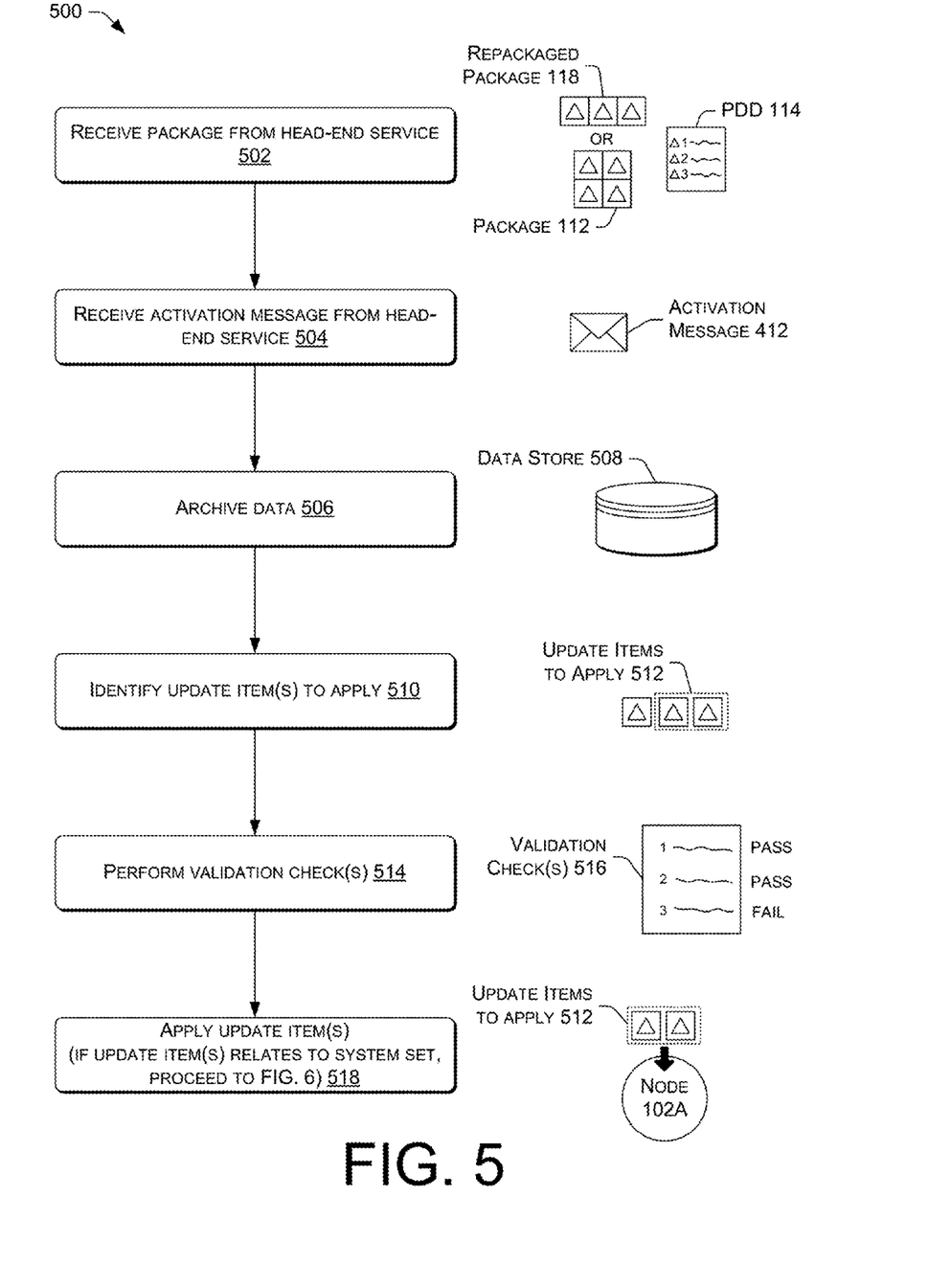
FIG. 5 illustrates an example process for updating software/firmware of a utility node device.
Figure 6:
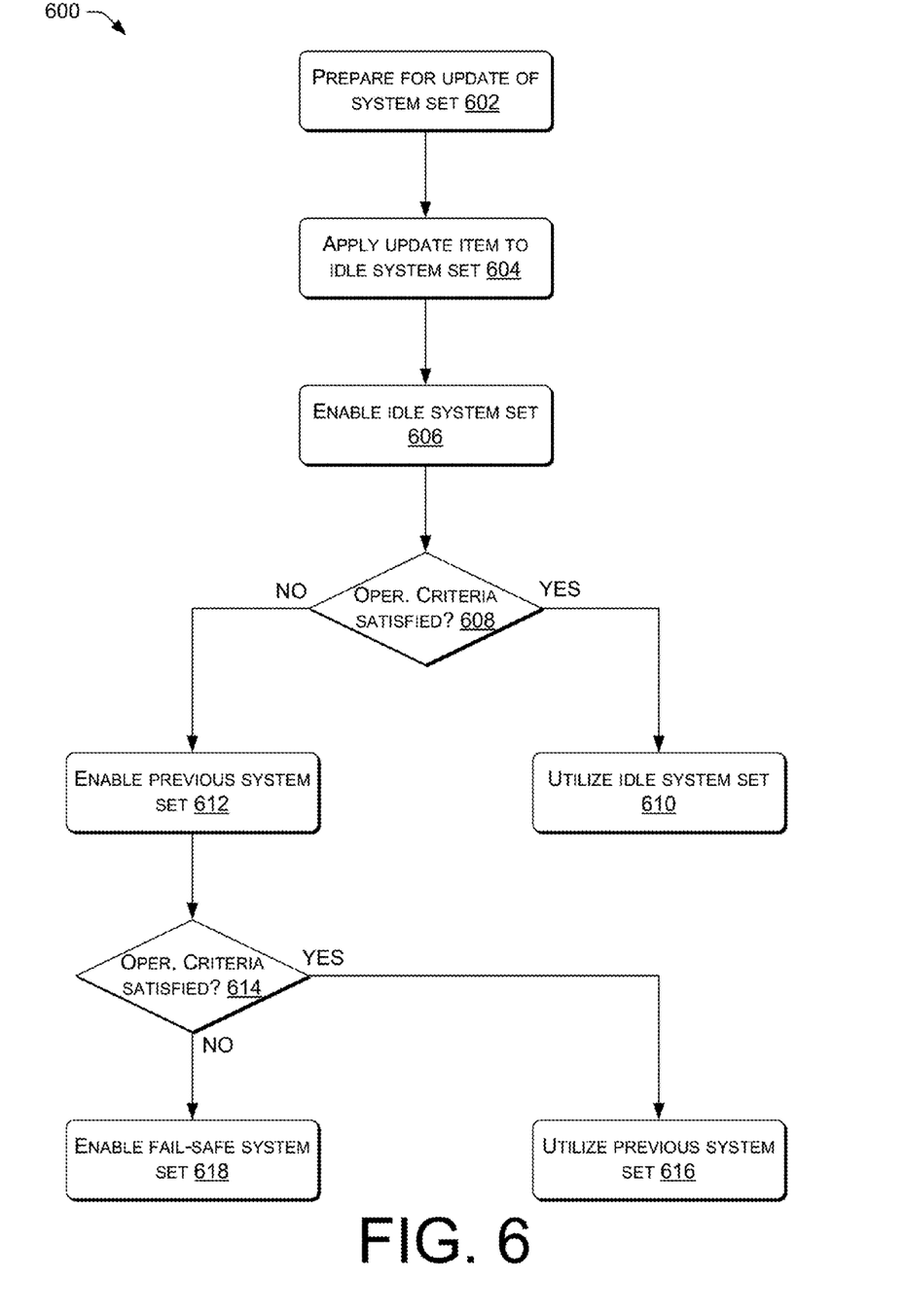
FIG. 6 illustrates an example process for updating a system set of a utility node device by utilizing a multi-system set configuration.

FIGS. 4-6 illustrate example processes 400, 500, and 600 for employing the techniques described herein. For ease of illustration processes 400, 500, and 600 are described as being performed in the architecture 100 of FIG. 1. For example, one or more of the individual operations of the process 400 may be performed by the head-end service 106 (e.g., the device(s) 116), while the processes 500 and 600 may be performed by the node 102A. However, processes 400, 500, and 600 may be performed in other architectures and/or using other devices. Moreover, the architecture 100 may be used to perform other processes.

The processes 400, 500, and 600 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any number of the individual operations may be omitted.

FIG. 4 illustrates the example process 400 for repackaging an update package and causing the update package or the repackaged package to be sent to a utility node(s).

At 402, the head-end service 106 may receive (e.g., obtain) the update package 112 from the package creation service 108. The update package 112 may include a plurality of update items for updating different types of utility node software/firmware. In some instances, the plurality of update items comprises delta files that each contain a difference between two or more versions of the utility node software/firmware. At 402, the package description data (PDD) 114 may also be received along with the package 112 or separately.

At 404, the head-end service 106 may identify one or more utility nodes to update and/or information related to updating the one or more utility nodes. The information may include a version of utility node software and/or firmware that is currently installed on the one or more utility nodes, a device type of the one or more utility nodes, hardware of the one or more utility nodes, and/or an end-version of utility node software/firmware to which the one or more utility nodes will be updated. In some instances, the interface 122 is displayed to a user to enable the user to select the one or more utility nodes and/or to enable the user to provide the information related to updating the one or more utility nodes.

At 406, the head-end service 106 may repackage the update package 112 to form the repackaged package 118. The package 118 may include one or more update items that are applicable to updating the one or more identified utility nodes, such as one or more update items that are applicable to a version of software/firmware that is already installed on a device and/or that are applicable to hardware of a device. The repackaging may be based on the PDD 114 and/or the information received at 404 related to updating the one or more identified utility nodes (e.g., current version installed on node, device type, hardware, end-version, etc.). To illustrate, if a particular type of utility node (e.g., poly-phase, single phase, etc.) has been selected to be updated, the service 106 may reference the PDD 114 to identify an update item that is designed for the particular type of utility node. The identified update item may be included in the repackaged package 118. In some instances, the PDD 114 may be modified based on the update items included in the repackaged package 118. Although the operation 406 is illustrated as being included in the process 400, in some instances the operation 406 may be omitted.

At 408, the head-end service 106 may cause the repackaged package 118 and/or the update package 112 to be sent to the one or more nodes identified at 404. The package 112 and/or 118 may be sent along with the PDD 114 to enable a node to identify contents of the package 112 and/or 118. The package 112 and/or 118 may be sent to the one or more nodes through an edge (e.g., cellular relay, cellular router, edge router, DODAG root, etc.) which serves as a connection point of a utility node network. As illustrated in the example of FIG. 4, the package 118, package 112, and/or PDD 114 may be sent to the node 102A.

At 410, the head-end service 106 may cause the one or more nodes that received the package 112 and/or 118 to update utility node software/firmware. Here, the service 106 may send an activation message to the one or more nodes instructing the one or more nodes to update the utility node software/firmware by applying/installing one or more update items included in the package 112 and/or 118.

FIG. 5 illustrates the example process 500 for updating software/firmware of a utility node device. At 502, the node 102A may receive (e.g., obtain) the update package 112 and/or the repackaged package 118 from the head-end service 106. The package 112 and/or 118 may be received along with the PDD 114. The package 112 and/or 118 may include a plurality of update items (e.g., firmware/software update data) for updating different types of utility node software/firmware. An update item may comprise a delta file containing a difference between two or more versions of the utility node software/firmware, such as sequential versions.

At 504, the node 102A may receive the activation message 412 from the head-end service 106. The message 412 may be received directly from the service 106 and/or through one or more other upstream nodes of the network. The message 114 may instruct the node 102A to activate the package 112 and/or 118, that is, to update the utility node software/firmware by applying/installing one or more update items of the package 112 and/or 118.

At 506, the node 102A may archive data of the node 102A, such as data of a system set, operating system, module, driver, and so on. For example, the node 102A may store an image of an active system set so that the node 102A may revert to this system set in the event that an error occurs while updating utility node software/firmware. Additionally, or alternatively, the node 102A may store back-up data that is common across multiple system sets. The data may be stored in a data store 508 associated with the node 102A.

At 510, the node 102A may identify one or more of the plurality of update items that are included in the package 112 and/or 118 to apply/install on the node 102A. The identification may be based on a version of utility node software/firmware that is currently installed on the node 102A. That is, the node 102A may identify which update items are applicable to updating a current version of utility node software/firmware. Alternatively, or additionally, the identification may be based on a type of hardware of the node 102A or associated with the node 102A. In one example, the node 102A may reference the PDD 114 to identify the update items that are applicable to updating the utility node software/firmware. As illustrated in FIG. 5, the node 102A has identified one or more update items 512 to be applied on the node 102A.

At 514, the node 102A may perform one or more validation checks 516 to verify that the one or more update items 512 may be applied to the node 102A. The one or more validation checks 516 may comprise checking that a device type of the node 102A matches a device type of an update item to be applied, checking that a prerequisite update item has been applied to the node 102A, checking that the node 102A is not operating on a secondary power source (e.g., battery), or checking any other function, data, or configuration of the node 102A. Based on the results of one or more validation checks 516, the node 102A may determine a level of compliance with the one or more validation checks 516. If, for example, a threshold number of the one or more validation checks 516 are satisfied the level of compliance may be relatively high, while if the threshold number is not satisfied the level of compliance may be relatively low.

At 518, the node 102A may apply/install the one or more update items 512 to the node 102A. This may allow software/firmware that is associated with the one or more update items 512 to be updated to, for example, a newer version of the software/firmware. In some instances, the node 102A may refrain from applying/installing other update items of the package 112 and/or 118 that were not identified to be applied. Further, in some instances the one or more update items may only be applied if the level of compliance of the one or more validation checks 516 is above a particular threshold. When, for example, an update item of the one or more update items 512 is related to a system set update for the node 102A, the process 500 may proceed to the process 600 discussed in detail below.

In some instances, when an update item is being applied to the node 102A at 518, a specific transfer process may be used for updating software/firmware on the node 102A that is associated with the update item. That is, the specific transfer process may describe how the update item is actually transferred to the node 102A. The specific process may be configurable by, for example, third parties so that the third parties may be enabled to update software/firmware in specific manner.

FIG. 6 illustrates the example process 600 for updating a system set of a utility node device by utilizing a multi-system set configuration. In some instances, the process 600 may be performed at operation 518 of process 500, while in other instances the process 600 may be performed independent of the process 500. As noted above, in one example the process 600 may be performed when an update item to be applied/installed on the node 102A is related to a system set update, such as when the update item comprises a system set image.

As noted above, the node 102A may include different system sets to maintain operation of the node 102A. In general, at any given time, only a single system set may be operating (e.g., "active"). The different system sets may include a first system set that is generally configured to act as an "active" system set, a second system set (e.g., "idle" system set) that is configured to operate when the first system set is non-operational or in an "idle" state, and a third system set (e.g., "fail-safe" system set) that is configured to operate when the first and second system sets are non-operational. In some instances, the third system set may comprise a factory installed set that remains unmodified on the node 102A. As such, the third system set may be a permanent system set that enables the node 102A to operate in the event that the first and second system sets are not operating properly. A system set may generally include a kernel and a root file system.

At 602, the node 102A may prepare to update a system set of the node 102A. For example, the node 102A may prepare an idle system set to be updated with an update item related to a system set. This may include clearing out an idle system set and/or copying an active system set to the idle system set. By doing so, the idle system set may be updated with a current version of the active system set, which may be a newer version than the idle system set version.

At 604, the node 102A may update the idle system set of the node 102A by applying/installing at least a portion of an update package to the idle system set. The idle system set may be updated while an active system set manages operations of the node 102A (e.g., performs normal processing). In instances when the update package includes update items that relate to different system set versions, the idle system set may be updated by applying one or more update items that are applicable to a current version of the idle system set. To illustrate, if the idle system set (e.g., the set copied into the idle system set from the active system set) comprises version 2, and the update package includes versions 1-3 of a system set, then update items for version 3 may be applied to the idle system set. The update items may be applied on a version-by-version basis in a sequential manner (e.g., starting at an earlier version and progressing toward a latest version). In some instances, the update items comprise delta files that each contain a difference between system set versions.

At 606, the node 102A may enable the idle system set to manage operation of the node 102A. That is, the idle system set may be set to an "active" state and the active system set may be set to an "idle" state. The idle system set may be enabled by reconfiguring and/or rebooting the node 102A into the idle system set.

At 608, the node 102A (now operating with the previously idle system set) may determine whether operation of the previous idle system set satisfies one or more operational criteria, such as determining that kernel and operating system files are compatible, system level applications can communicate with each other and/or external devices, database data is not corrupt, required files and correct versions were installed and are compatible, etc. When the one or more operational criteria are satisfied, the node 102A may utilize the updated idle system set, at 610. That is, the node 102A may operate with the idle system set in the "active" state. Alternatively, when, at 608, the one or more operational criteria are not satisfied, the process 600 may proceed to 612.

At 612, the node 102A may enable the previously active system set by reconfiguring and/or rebooting the node 102A into the previously active system set. Here, the node 102A may "rollback" or "revert" to the previous system set. In reverting to the previous system set, any data that was archived in relation to the previously active system set may be restored (e.g., data archived at 506 of FIG. 5). This may include restoring data that is common across multiple system sets.

After reverting to the previously active system set, the node 102A may, at 614, determine whether operation of the active system set satisfies one or more operational criteria. When the one or more operational criteria are satisfied, the node 102A may utilize the previously active system set, at 616. That is, the node 102A may operate with the previously active system set in the "active" state. Alternatively, when, at 614, the one or more operational criteria are not satisfied, the process 600 may, at 618, enable a fail-safe system set (e.g., permanent system set). The fail-safe system set may be installed at the factory where the node 102A is constructed or configured. In some instances, the node 102A may report to the head-end service 106 whether or not the previous system was enabled at 612 and/or whether or not the fail-safe system set was enabled at 618. By utilizing different system sets, the node 102A may maintain operation of the node 102A, even in the event that one or more system sets fail.

Example User Interface

Figure 7:
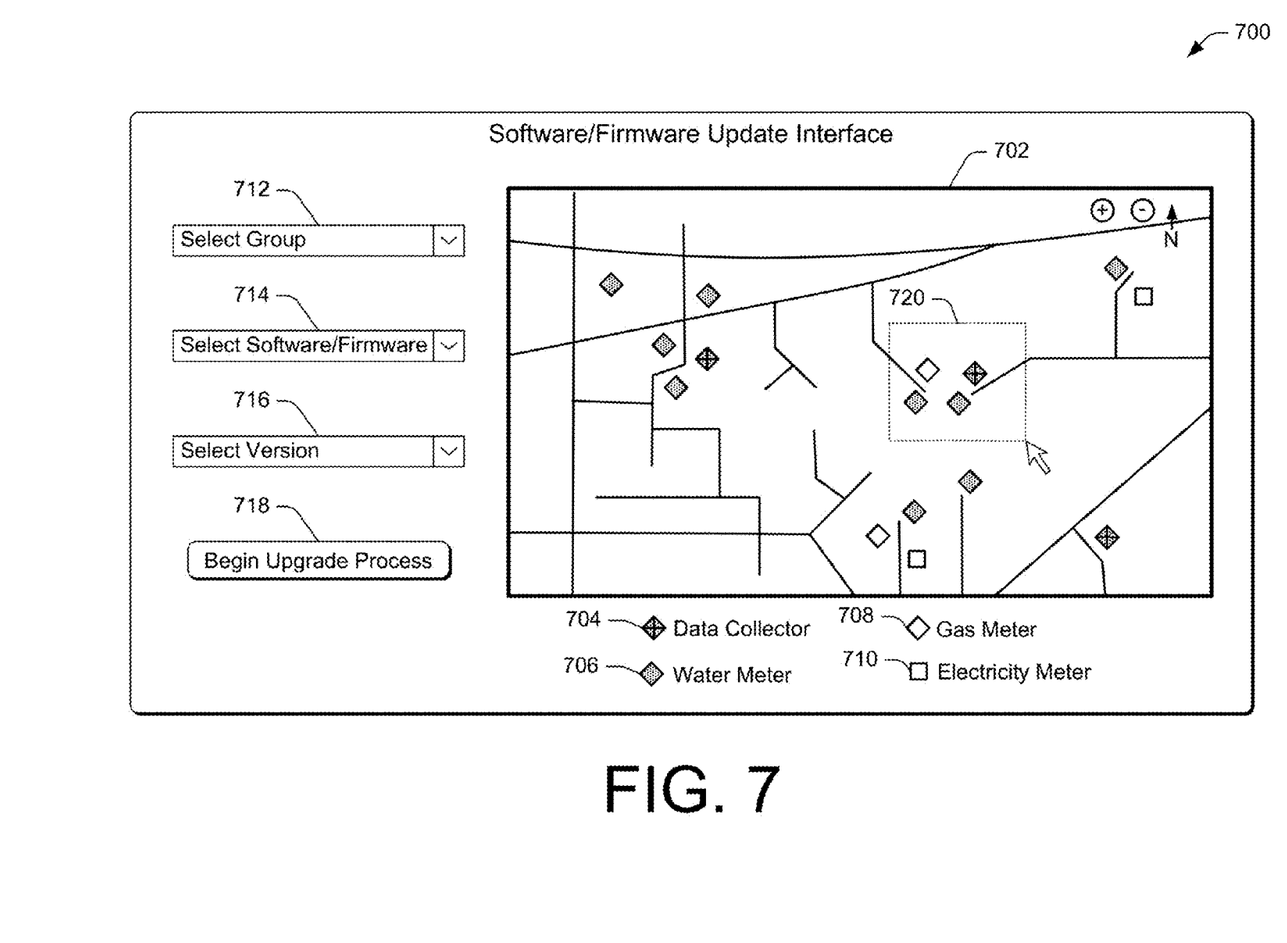
FIG. 7 illustrates an example user interface to deploy an update package to one or more utility nodes.

FIG. 7 illustrates an example user interface 700 to deploy an update package to one or more utility nodes. In one example, the interface 700 is representative of the interface 122 of FIG. 1. As such, the interface 700 may be usable to enable a user associated with the head-end service 106 to distribute update packages. However, in other embodiments the interface 700 may be displayed to other users. The interface 700 may be accessed through the internet in a web-environment, a client application, and so on.

The interface 700 may include a map area 702 to display a geographical area where one or more utility nodes are located, such as a map of a neighborhood, city, etc. The map area 702 may be selectable to enable a user to select utility nodes. In the example of FIG. 7, the solid lines in the map area 702 represent roads, however in other examples the lines represent utility lines (e.g., water pipes, electricity/gas lines, etc.) or other features.

As illustrated, the interface 700 may represent different types of utility nodes with different icons. For example, an icon 704 may be associated with a data collector, an icon 706 may be associated with a water meter, an icon 708 may be associated with a gas meter, and an icon 710 may be associated with an electricity meter. Although interface 700 presents the icons 704-710 based on a general functionality of the utility nodes, the interface 700 may alternatively, or additionally, present icons based on any type of information associated with the utility nodes.

The interface 700 may include drop-down menus 712-716 to enable a user to select different information for updating nodes of a utility network. Through the drop-down menu 712 the user may select a group of utility nodes, such as nodes associated with a same device type (e.g., a smart meter, cellular relay, router, sensor, poly phase or single phase device, and so on). Through the drop-down menu 714, the user may select software/firmware to be updated on utility nodes and through the drop-down menu 716 the user may select an end-version to which utility nodes will be updated. In one example, the drop-down menu 716 may allow a user to select a latest available version of software/firmware. The interface 700 may also include a button 718 to begin an update process after, for example, providing information in the drop-down menus 712-716.

In one example of the interface 700, the map area 702 may display a plurality of icons that represent utility nodes of a utility network. As a user interacts with the interface 700, the interface 700 may receive a selection from the user identifying one or more utility nodes to update. For example, the user may select icons located within an area 720 (e.g., area encompassed by the dotted rectangle). The interface 700, or a device associated with the interface 700, such as the device 120 and/or 116 of FIG. 1, may then identify one or more utility nodes that are associated with the icons. The user may also provide information through the drop-down menus 712-716 to configure an update. For instance, through the drop-down menu 716 the user may select an end-version of software/firmware to which utility nodes associated with the area 720 will be updated. Thereafter, the user may initiate the update by selecting the button 718. Based on the input information, back-end functionality associated the interface 700 may select update items that are applicable to updating the identified utility nodes to the selected end-version.

Example Memory Structure of a Utility Node

Figure 8:
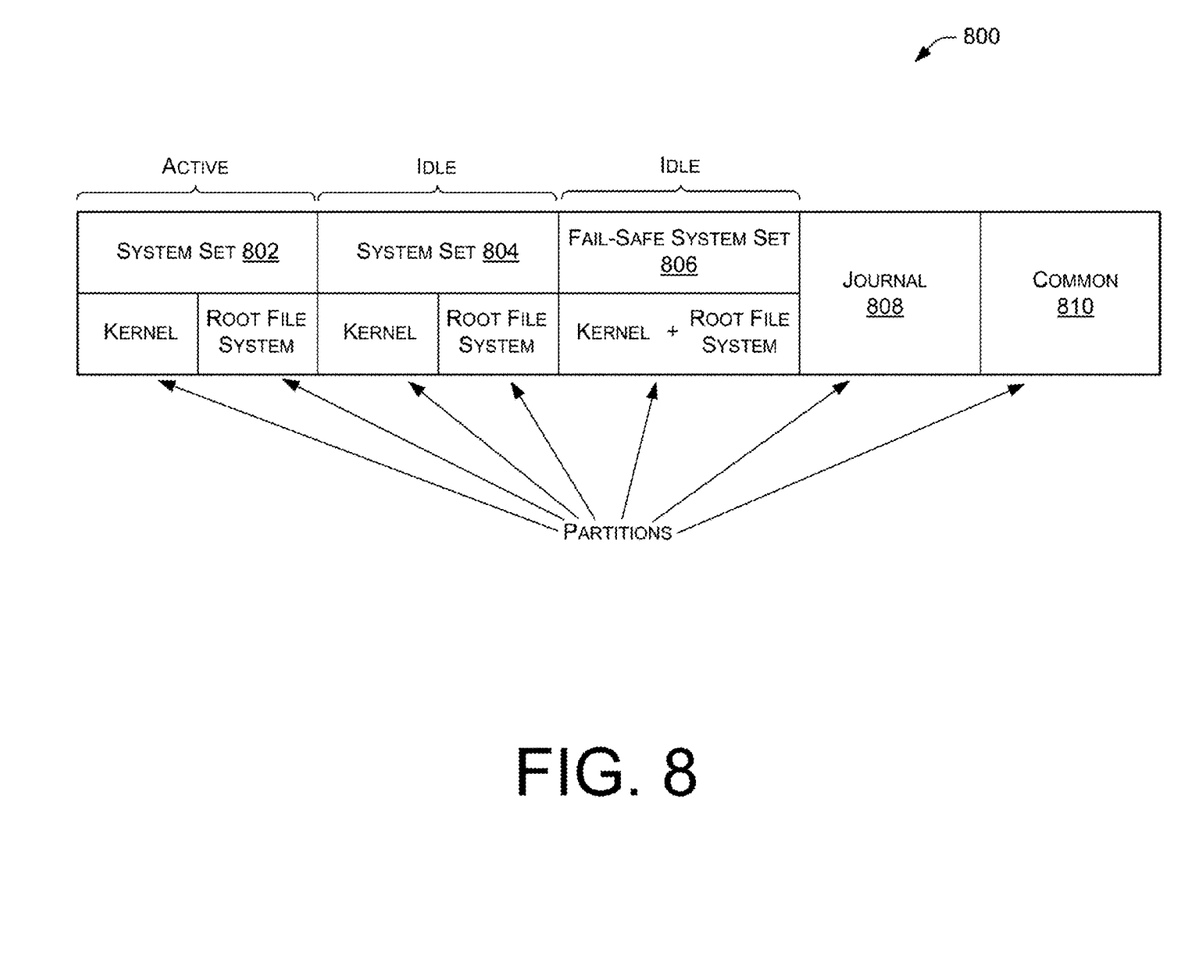
FIG. 8 illustrates an example memory structure of a utility node.

FIG. 8 illustrates an example memory structure 800 of a utility node. In particular, the memory structure 800 includes multiple partitions that store different types of data. For example, the memory structure 800 includes a partition for a kernel of a system set 802, a partition for a root file system of the system set 802, a partition for a kernel of a system set 804, a partition for a root file system of the system set 804, a partition for a kernel and root file system of a fail-safe system set 806, a partition for a journal 808, and a partition for common data 810. The journal partition 808 may include data to indicate which system set will operate the utility node. That is, which of system sets 802-806 will be operating in an "active" state and which of the system sets 802-806 will be operating in an "idle" state. The common partition 810 may include data that is shared across the system sets 802-806. The system set partitions 802 and 804 may be modified, while the fail-safe system set partition 806 may be a permanent system set that is not designed to be modified.

In one example of use of the memory structure 800, the system set partition 802 may be in an "active" state, meaning that the system set partition 802 is being used to operate the utility node. Meanwhile, the system set partition 804 and fail-safe system set partition 806 may be in an "idle" state (e.g., inactive). In this configuration, when an update to a system set is requested, the system set 804 may be updated while the system set partition 802 maintains operation of the utility node. After the update, the system set partition 804 may be enabled to take-over operation of the utility node and the system set partition 802 may be set to an "idle" state. If the system set partition 804 is non-operational, the system set partition 802 may be reactivated. Thereafter, if the system set partition 802 is non-operational, the fail-safe system set partition 806 may be activated.

In some instances, the fail-safe system set partition 806 may be configured to be activated when any type of error occurs on the utility node. For example, the fail-safe system set partition 806 may be enabled when data becomes corrupt in the system set partitions 802 and 804 (e.g., in the case of virus or other harmful data), the system set partitions 802 and 804 are unable to boot, database data or other files are corrupt, hardware communication fails, files are missing, a system set configuration does not satisfies one or more criteria, etc. As such, the fail-safe system set partition 806 may generally act as a second backup in case any problems occur on the system set partitions 802 and 804.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A method comprising:
receiving, by a node of a network, an update package from a head-end device of the network;
updating, by the node, a first system set by applying at least a portion of the update package to the first system set while a second system set manages operation of the node;
utilizing the first system set to manage operation of the node;
reverting to the second system set in response to determining that operation of the first system set does not satisfy one or more operation criteria; and
utilizing a third system set to manage operation of the node in response to determining that operation of the second system set does not satisfy the one or more operation criteria, the third system set being unalterable by the node.

2. The method of claim 1, wherein at least one of the first system set, the second system set, or the third system set comprises an operating system.

3. The method of claim 1, wherein:
the update package includes a plurality of update items for updating different system set versions; and
the first system set is updated by applying one or more of the plurality of update items that are applicable to updating a current version of the first system set.

4. The method of claim 3, wherein the one or more update items that are applied comprise one or more delta files each containing a difference between two system set versions.

5. The method of claim 3, wherein the first system set is updated version-by-version in a sequential manner.

6. The method of claim 3, further comprising:
before updating the first system set, clearing the first system set; and
copying the second system set to the first system set so that the first system set comprises a copy of the second system set.

7. The method of claim 1, further comprising:
before updating the first system set, storing back-up data that is common to the first system set and the second system set;
wherein the reverting to the second system set includes setting the second system set to an active state and restoring the back-up data.

8. A device comprising:
a radio configured to receive an update package for updating a first system set of the device;
one or more processors; and
memory communicatively coupled to the one or more processors, the memory storing one or more instructions that, when executed by the one or more processors, cause the one or more processors to perform acts comprising:
updating the first system set with at least a portion of the update package;
utilizing the first system set to manage operation of the device;
determining that operation of the first system set does not satisfy one or more operation criteria; and
based at least in part on determining that operation of the first system set does not satisfy the one or more operation criteria, utilizing a second system set to manage operation of the device, the second system set comprising a permanent system set.

9. The device of claim 8, wherein the device comprises a utility node associated with a utility meter.

10. The device of claim 8, wherein the device comprises at least one of a sensor, a control device, a transformer, a switch, or a relay.

11. The device of claim 8, wherein the first system set includes at least one of a kernel that manages hardware resources of the device or a root file system having data to operate the device.

12. The device of claim 8, wherein the acts further comprise sending information to a head-end device that indicates at least one of that the operation of the first system set does not satisfy the one or more operation criteria or that the second system is set to manage operation of the device.

13. The device of claim 8, wherein the first system set is in an idle state before the utilizing the first system set to manage the operation of the device.

14. One or more non-transitory computer-readable storage media storing computer-readable instructions that, when executed, instruct one or more processors of a node to perform operations comprising:
receiving an update package related to an operating system update;
updating a first operating system of the node by installing at least a portion of the update package;
enabling the first operating system;
determining that operation of the first operating system does not satisfy one or more operation criteria; and
in response to determining that the operation of the first operating system does not satisfy the one or more operation criteria, enabling a second operating system that is unalterable by the node.

15. The one or more non-transitory computer-readable storage media of claim 14, wherein the second operating system comprises a factory-installed operating system.

16. The one or more non-transitory computer-readable storage media of claim 14, wherein:
the update package includes a plurality of update items for updating different operating system versions; and
the first operating system is updated by installing one or more of the plurality of update items that are applicable to a current version of the first operating system.

17. The one or more non-transitory computer-readable storage media of claim 14, wherein the update package is received from a utility node that is associated with a utility meter.

18. The one or more non-transitory computer-readable storage media of claim 14, wherein the operations further comprise reporting to a head-end device that the operation of the first operating system does not satisfy the one or more operation criteria.

19. The one or more non-transitory computer-readable storage media of claim 14, wherein the at least the portion of the update package that is installed includes one or more delta files each containing a difference between two operating system versions.

20. The one or more non-transitory computer-readable storage media of claim 14, wherein the operations further comprise:
    before updating the first operating system, clearing the first operating system; and
    copying a third operating system to the first operating system so that the first operating system comprises a copy of the third operating system, the third operating system managing operation of the node while the first operating system is updated.

* * * * *